July 12, 1966 R. M. DYKSTERHOUSE 3,259,968
METHOD AND APPARATUS FOR FABRICATION AND IN
SITU TESTING OF WIRE HARNESS STRUCTURES
Filed Aug. 4, 1961 3 Sheets-Sheet 1

INVENTOR.
Robert M. Dyksterhouse
BY
Miller, Morriss & Pappas
ATTORNEYS

July 12, 1966   R. M. DYKSTERHOUSE   3,259,968
METHOD AND APPARATUS FOR FABRICATION AND IN
SITU TESTING OF WIRE HARNESS STRUCTURES
Filed Aug. 4, 1961   3 Sheets-Sheet 2
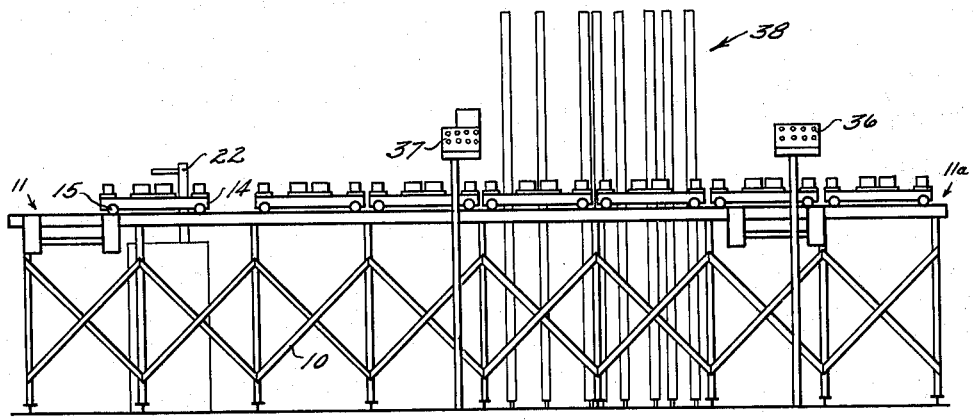
FIG-3-
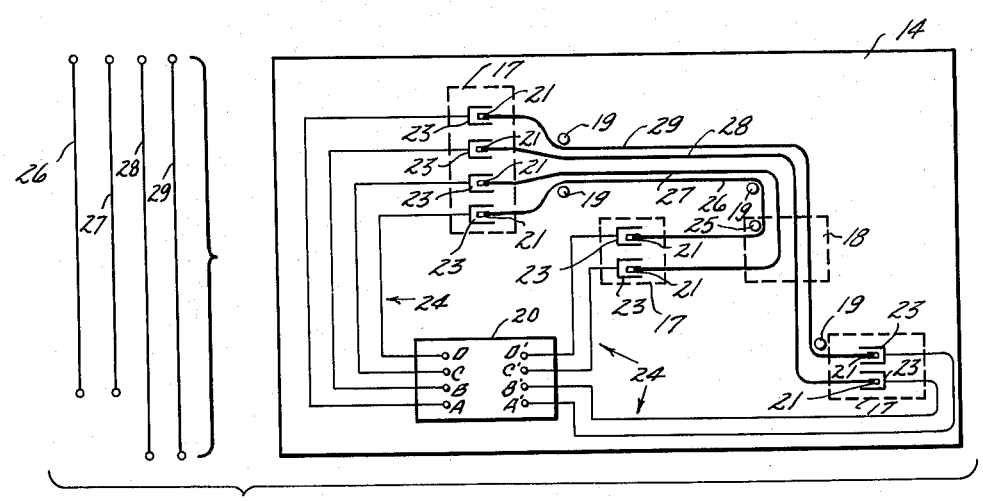
FIG-4-
INVENTOR.
ROBERT M. DYKSTERHOUSE
BY
Miller Morriss & Pappas
ATTORNEYS July 12, 1966 R. M. DYKSTERHOUSE 3,259,968
METHOD AND APPARATUS FOR FABRICATION AND IN
SITU TESTING OF WIRE HARNESS STRUCTURES
Filed Aug. 4, 1961 3 Sheets-Sheet 3
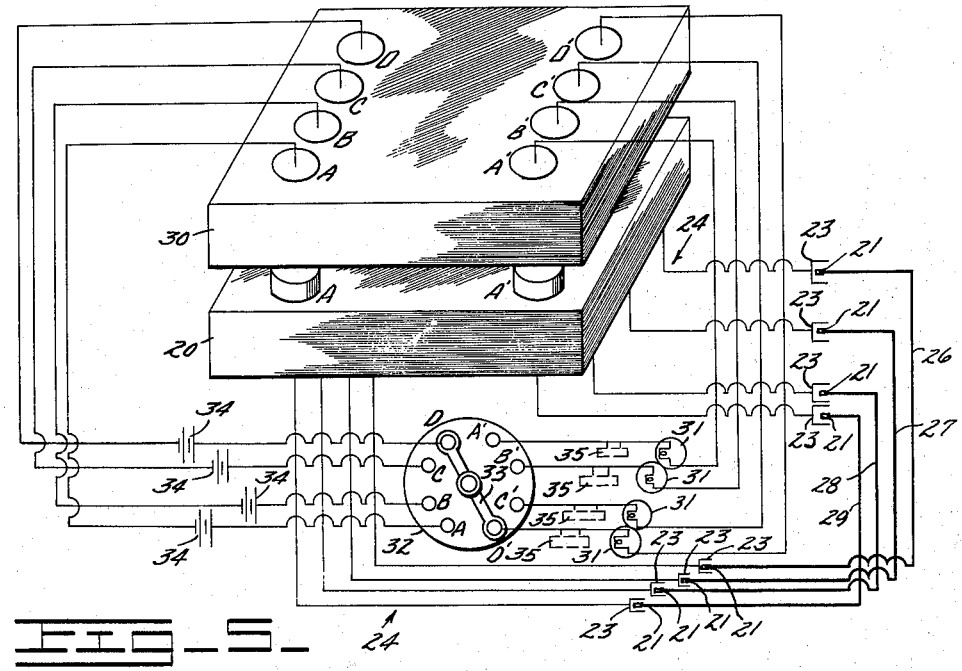
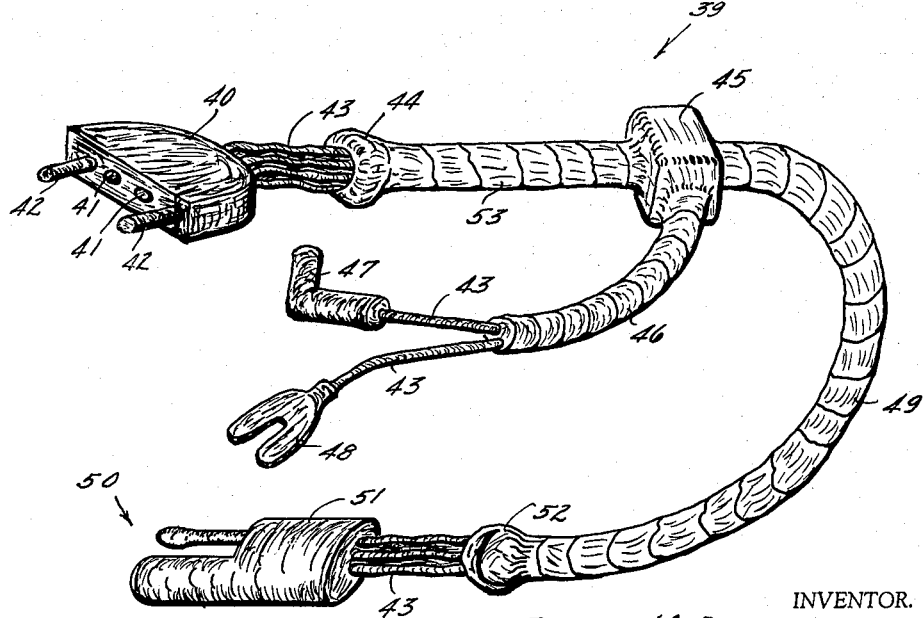
INVENTOR.
Robert M. Dyksterhouse
BY
Miller, Morris, & Pappas
ATTORNEYS

United States Patent Office 3,259,968
Patented July 12, 1966

3,259,968
METHOD AND APPARATUS FOR FABRICATION AND IN SITU TESTING OF WIRE HARNESS STRUCTURES
Robert M. Dyksterhouse, Charlevoix, Mich., assignor, by mesne assignments, to Circuit Controls Corporation, Petoskey, Mich., a corporation of Michigan
Filed Aug. 4, 1961, Ser. No. 129,274
13 Claims. (Cl. 29—407)

This invention relates to a method and apparatus for the fabrication of wire harness structures and more particularly to a method and apparatus for the automated assembly, in situ testing, encapsulating and wrapping of circuit elements into wire harnesses of uniform configuration and which harnesses are substantially free from defects normally inherent in such structures.

More specifically, the instant invention relates to a method and apparatus for assembling circuit elements into a wire harness configuration; electrical testing in situ the thus assembled circuit elements; to provide molded connector housings and selected molded branch junctions of the wire harness; final electrical testing in situ of the thus encapsulated wire harness for electrical continuity and millivolt drop; and wrapping the main leads and branches of the wire harness thus fabricated.

A need has existed for a new technique and apparatus for producing wire harnesses for use in automotive, aircraft, appliance and electronic industries which employ electronic wire harness circuitry. The fabrication of wire harnesses has heretofore encountered many problems such as lack of uniformity in ultimately formed branch and circuit lengths; inadequate testing which imposes a time and cost penalty to wire harness fabrication and inspection; unavailability of substantially complete automation in wire harness production arising from the fact that testing was not amenable to assembly line techniques; damage to individual circuit leads of assembled wire harnesses due to manual handling between successive work stations; lack of standard means to prevent chance dislodgment of branch elements; large numbers of rejects due to damage to circuit elements from hand gathering of circuit leads; discovery of defects in improper time for corrections; improper encapsulation of lead elements; defective connector housings resulting from poor connector positioning; and damage to wire harnesses due to improper wrapping. Elimination of human error and minimization of manipulative handling of wires comprising the finished wire harness characterizes the present approach in elimination of the indicated difficulties.

The lack of uniformity in branch and circuit length has made it difficult to automate the in situ molding of terminal connector housings and testing of the wire harness lead and terminal elements. Electrical testing of the wire harness and elements thereof has heretofore required the use of ancillary out of situ production steps and equipment not amenable to automation. This has resulted in an increase of fabrication time and attendant higher labor and equipment costs. Avoidance of these burdens and penalties has been constantly sought.

Lack of uniformity in length of wire harness branch and circuit elements caused by prior assembly and fabrication techniques has resulted in harnesses which do not fit in their ultimate use environment. The present invention, as will be seen, seeks to prevent such lack of uniformity by providing positive means assuring precise dimensional control over lead and branch lengths and eliminating chance dislodgment of juncture control elements.

Lack of automation and lack of in situ testing have contributed to serious economic loss since both materials and labor have been applied to producing wire harnesses that contain fatal harness defects that are discovered only after completion of the harness or upon failure in ultimate tests or use. The lack of in situ testing during critical steps in the production of wire harnesses has resulted in the discovery of such defects only after a wire harness has been completely fabricated and wrapped. This has precluded corrective repairs during the early stages of production when such repairs could easily have been made.

Upon installation of such improperly fabricated wire harnesses in their environmental use settings other problems have been encountered. Lack of uniformity in branches and leads (whether arising before, during or after fabrication) and other defects have caused handling difficulties during installation of such wire harnesses in their ultimate use positions resulting in additional potential damage to the wire harness. For instance, such damage occurs when a workman strips leads from their encasement in an effort to obtain proper lead length for connections with associated equipment. Hence, defects brought about by improper fabrication and production of the harness are compounded upon installation by attempts to correct the deficiencies coming to light at the point of harness use, thus contributing to electrical failure by reason of broken and chafed wires resulting from such attempts.

It is therefore an object of the instant invention to incorporate in situ electrical continuity and millivolt drop checks of wire harnesses during fabrication thereof without disruption of production sequence and without loss of time and expense.

Another object of the instant invention is to provide a method and apparatus for enhancing standardization and uniformity in the assembly of circuit leads into wire harnesses to assure properly oriented and correctly dimensioned branch and main lead portions.

A further object of this invention is to provide in situ preliminary electrical continuity testing of assembled wire harness elements to insure proper orientation thereof prior to encapsulation at the terminals and selected branch junctions thereof to complete an integrally formed wire harness structure. Corollary to this object is the discovery and correction of defects before the defective harness becomes an economic loss.

Another object of this invention is to provide a wire harness assembly board fixture with integrated test means for use in an assembly line environment and which coordinates the selected assembly and grouping of circuit leads into properly oriented elements of a wire harness structure.

A still further object of this invention is to provide in situ final electrical continuity and millivolt drop testing prior to wrapping and removal of the completed wire harness structure from the assembly line and subsequent to encapsulation at the terminals and branch junctions.

Another object of this invention is to provide a method and apparatus for the substantially automated fabrication of a wire harness structure wherein circuit lead elements are selectively mounted on a movable assembly board fixture in their final wire harness configuration and then are conveyed through a series of production stations wherein in situ testing and encapsulation at the terminals and branch junctions is accomplished and all occurring without manual handling of the assembled wire harness, or removal thereof from the assembly board fixture.

Another object of this invention is to provide a method and apparatus for substantial automation of the wrapping of a tested and terminal encapsulated wire harness structure having fixed encapsulated branch junctions.

Yet another object of this invention is to provide a method and apparatus for the complete production of a wire harness structure wherein in situ assembly, testing, repair, terminal encapsulation, fixing of branch junctions, and wrapping are integrated.

A still further object of this invention is to provide a method and apparatus for the production of wire harnesses which discovers, pin points, and provides for the selective correction of defects not apparent from visual inspection without interference with production sequence.

Another object of this invention is to provide a wire harness structure having in situ tested resin encapsulated terminals and properly positioned and dimensioned branch portions fixed by use of resin matrix molded elements providing a positive clinch at branch junctions throughout the wire harness.

Another object of this invention is to provide a wire harness structure configured to provide for simplified wrapping and facilitating ease of installation in ultimate use as a consequence of proper fixing of lead lengths, branch location, and assured proper conductivity.

Still another object is to provide test terminal means integral with the wire harness assembly board fixture to accomplish mating register with a test fixture non-integral with the wire harness assembly board fixture so as to accomplish selected closure across selected circuits in the harness assembly providing visual electrical response indicating that the proper circuit is properly oriented in the harness and that the wire is properly conductive.

Still another object includes the method of assembling a harness to a board by stepwise attachment of a plurality of lead elements in terminal receiving sockets and around selected guide pins and wherein said sockets receiving the terminals are led to a circuit closing test panel provided on said board, and the test panel adapted to selectively close selected of the circuits providing visual or audible testing.

Other objects and advantages of the instant invention will become apparent from a consideration of the following specification in connection with the appended claims and the accompanying drawings.

In the drawings:

FIGURE 3 is an elevation view of the assembly line apparatus which illustrates the wire harness assembly and test board fixtures provided with rollers engaging the assembly line tracks and schematically shows the test, mold, and wrap apparatus positions in relation to the assembly line itself.

Figure 1:
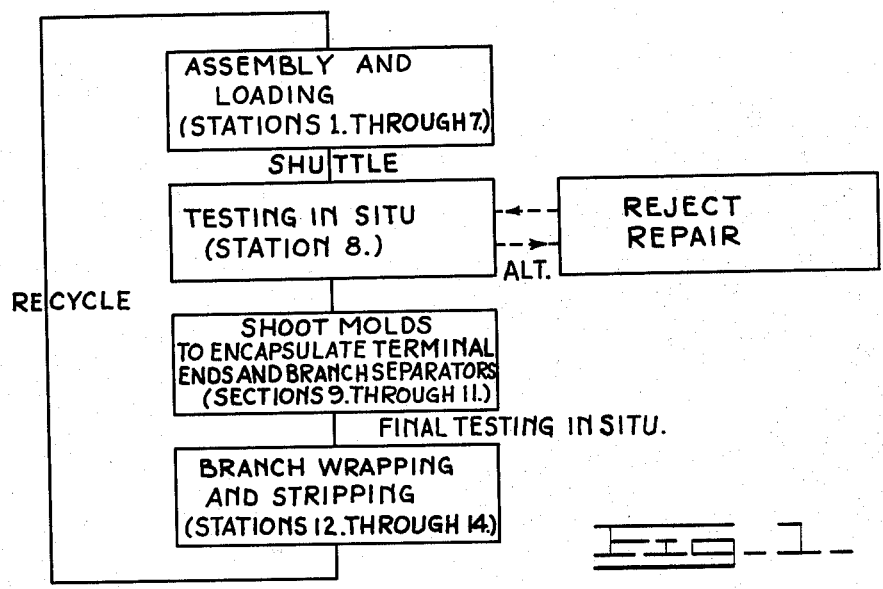
FIGURE 1 is a schematic flow chart illustrating the basic steps utilized in the unique method for fabricating a wire harness embodied in the instant invention and indicating the apparatus stations at which each step is accomplished.

FIGURE 4 is a schematic plan view of individual circuit lead elements utilized in a hypothetical wire harness and illustrating a wire harness assembly board fixture with the circuit elements shown in heavy line thereon assembled into their wire harness configuration by use of branch junction molds, terminal socket test molds and locator pins and further illustrating the test leads leading from the terminal socket test molds to an assembly board multiple contactor block.

FIGURE 5 is a schematic view of the multiple contact test block in conductive engagement with the assembly board multiple contact block so as to superimpose a selector, test, and indicator circuit upon the circuit leads of an assembled wire harness.

FIGURE 6 is a perspective view of a completed wire harness illustrating the encapsulated terminals, the wrapped main and branch portions thereof, and the integrally molded resin matrix branch take-out elements utilized to fix selected of the wire leads of the harness in a uniform properly oriented lead-out relation to each other.

*General description*

In general, a new method and apparatus is provided for wire harness fabrication whereby in situ testing is incorporated into the manufacturing sequence so as to provide an electrically tested wire harness at no cost penalty. Uniformity and proper circuit orientation is provided in the completed wire harness by use of a wire harness assembly board fixture upon which each wire circuit lead element is loaded into its properly oriented position in accord with the wire harness overall final configuration and dimensions. Once the leads which are to comprise the harness are assembled and gripped in the proper run condition on the board, then they are tested to assure proper electrical conductivity and orientation. When thus loaded and checked, the leads are fixed in their grouping by means of molded junction take-out elements forming a resin matrix in which the wire leads are imbedded and the junction thus becomes an integral part of the completed wire harness providing positive location and dimensioning of branch and main leads. Desired encapsulation at the terminal elements is accomplished as by molding sockets thereabout and testing is accomplished in situ. Molded ring members are also utilized to imbed and clinch selected of said wire leads together at points on the harness other than branch junctions.

The apparatus utilized in the preferred embodiment of the invention consists of an assembly line support frame upon which runways are positioned to provide an elongate rectangular closed track. A plurality of wire harness assembly and test board fixtures are movably provided on said runways for cycling around the closed track. Each of the wire harness assembly test board fixtures are provided with terminal socket molds, take-out molds, and locator pins which are selectively positioned upon the board fixture surface so as to coordinate the assembly of individual wire circuit elements thereon into a completed wire harness configuration grouped in accord with the layout on the assembly board fixture.

It is pointed out that the individual wire circuits that make up a wire harness are of varying length and, hence, the stringing of an individual wire from one mold to another, around a pre-determined locator pin and/or through a take-out mold, provides a positive checked assembly assuming that the correct wire element is being used. If the correct wire is used and is properly strung on the assembly board, each end of the wire will just reach into and engage the proper receptacles in the terminal socket molds at either extremity of the wire leads.

A portion of a test circuit is integrally provided on the movable assembly fixture which consists of test leads from the receptacles in the terminal socket molds to a multiple contact block member. This involves the use of a lead from each terminal receptacle to the contact block so that closing of an electrical circuit at the test block passes electrical energy through the selected lead if the wire is sound and properly connected.

A plurality of work stations are spaced about the rectangular assembly line structure in accordance with the operations to be performed on a given harness. The wire harness assembly board fixture is sequentially rolled from station to station so as to complete fabrication and testing of the wire harness in accordance with a pre-determined production and test sequence. As will be appreciated, testing does not interrupt work flow and the harness remains in its position on the assembly board to end removal.

The first stations are merely assembly stations wherein the individual wire circuits are mounted upon the board fixtures in a predetermined manner to form the basic wire harness configuration. In these assembly stations, the terminal ends of the individual wire circuit elements are placed within mating receptacle sockets and at predetermined points are strung through take-out molds and around locator pins.

After the individual wire circuit elements have been assembled onto the assembly board fixture to form the assembled wire harness, the assembly board fixture is shuttled to the electrical continuity apparatus which consists of a multiple contact test block which is designed to selectively matingly and registerably engage the multiple contact block provided on the assembly board fixture so that the individual contacts of each block are in registering conductive contact with each other. In this manner, an electrical continuity test circuit is superimposed upon and closes the individual wire harness lead circuits on the assembly board fixture as established by each individual harness lead wire and associated test leads from the terminal molds to the contactor block. The test circuits include a power source, light indicating elements and a selector switch. The operator actuates the selector switch so as to selectively energize the individual lead circuits. If the terminal of each individual wire harness circuit element has been properly assembled into its respective terminal receptacles provided in the terminal molds, the respective light indicator means is energized and a positive continuity check is obtained by the progressive energization of each circuit.

If a light indicator does not function on any circuit in the harness there is an open end, hence, a defective circuit exists. If two or more lights become energized, a short exists and, hence, a defective wire harness is discovered. In this manner, the defect is located or confined to the indicated circuit. This accurate pin pointing of defects greatly facilitates repair.

A repair station is included in the assembly line to which an assembly board fixture bearing a defectively assembled wire harness may be shunted for corrective repair prior to continuing fabrication and encapsulation of the terminal ends thereof to form contact sockets. Upon performance of the necessary repairs, the assembly fixture is returned to the assembly line for the next step in the production sequence.

The stations in the production sequence, directly after the foregoing preliminary electrical continuity check station, involve the actual shooting of the terminal socket molds and branch take-out junction molds in which the leads have been positioned. Suitable vertically oriented mold machines are positioned above the assembly line track and are in register with the respective molds on the assembly board fixture when it is moved into position at each mold station.

After the molds are shot or molded, a final electrical continuity check is performed in situ to insure that no damage occurred to the individual wire harness circuit elements during the molding operation. For example, a terminal end may have pulled free from the receptacle and moved into shorting contact with an adjacent terminal end. At this station, a millivolt drop check is also performed across each individual wire harness circuit in order to discover such defects as cut strands, excessive crimping, defective wire (thin) and the like. If no defects are discovered in the wire harness, the assembly board fixture is moved to the next station.

The next station in the assembly line structure involves the in situ wrapping of wire harness structure after the encapsulated terminal sockets and molded branch take-outs have been removed from their respective molds. A spiral automatic wrap machine as well known in the art is provided at this station and may be selectively moved into contact with the assembly board fixture passing through the wrap station so as to provide for rapid uniform wrapping of the wire harness. Movement of the board is coordinated with the wrapping action to assure proper lead in the wrapping by tape. After the wire harness has been wrapped, the assembly board fixture is unloaded and is shuttled back to the original starting station. The completed wire harness is removed for packing and shipment. The assembly board fixture is then ready for recycling and assembly of a new wire harness structure thereon.

It is thus seen that a unique method and apparatus is provided for the fabrication of wire harnesses whereby the wire harness structure is held in a substantially fixed position during manufacture and, hence, damage to fragile wire elements is held to a minimum. In addition, the built-in or in situ testing methods along the production line hold rejects to a minimum inasmuch as defects are discovered, pin pointed, and corrected prior to encapsulation of terminal ends and before wrapping of the wire harness which would make such repairs difficult, if not impossible.

*Specific description*

Referring to the drawings and more specifically, to the flow chart shown in FIGURE 1, a schematic presentation of the basic steps and sequencing thereof is shown in accord with the inventive method for fabrication and in situ testing of wire harness structures. The flow chart of FIGURE 1 is referenced to the assembly line structure shown in the plan view of FIGURE 2 and the elevation view of FIGURE 3.

As expressed in FIGURE 1, the process is continuous in a closed cycle with shunt out provisions for repair. As will be seen in reference to FIGURES 2, and 3, a plurality of wire harness assembly board fixtures are arranged to move about the cycle. Initially the boards are loaded or assembly is accomplished by inserting lead wires into receptacles provided to receive the terminal ends of the leads or wires. The leads are also threaded about locating pins to assure proper dimensional control on the board.

At branch junction lead out points, the leads are grouped and directed radially therefrom toward their terminal positions. This provides a manipulative control over assembly since the length of leads will vary and, aside from color coding, the proper length is required for fit in the ultimate use position. Where desirable, a color coded diagram may be provided indicating the proper wire orientation applied directly to the surface of the board. These provisions allow the use of unskilled personnel in assembly.

The wire leads which ultimately and collectively comprise the harness are provided with terminal connectors soldered, crimped or otherwise affixed to the terminal ends of each wire. These terminal connectors, in turn, are inserted and retained by mating sockets or receptacles provided on the board and in molds where the terminal connectors are to be encapsulated with insulating material to form connector jackets or sheaths.

As thus assembled, the boards are successively moved to a testing station where, by reason of circuits which include the leads and coordinated board contacts, electrical energy is passed selectively through each of the leads by a closing of the selected circuits to provide a visual readout indicating that the circuit is properly wired and capable of conducting electricity. In the event of failure, the defficient lead is accurately pinpointed by the testing and is tagged for appropriate correction. At this point, the board indicating defective wiring is shunted from the production cycle so as not to interfere or delay continuous production. When repair is accomplished, the board is returnable, intermediate any flow of boards, to the testing station. No harness assembly having assembly defects may move beyond this repair and test point without passing the test of orientation and conductivity, generally referred to as a "continuity check."

The thus tested harness assemblies pass sequentially through a plurality of work stations wherein the work performed is arranged so that the harness assembly is not removed from the board thereby wholly avoiding human error and damage caused by handling or manipulation. At this point, for example, molds are filled or shot to selectively encapsulate the terminal connectors as secured in the connector receptacles. It should be noted that the receptacles provide a continuous orienting contact with the terminal ends of the leads prior to, during, and immediately after encapsulation molding. Molding of branch junction take-outs or separator elements is also accomplished at this time as the boards pass the mold elements into registry with resin injection structures. When these operations have been completed and without removal of the harness from the boards or molds, a final electrical test is applied using the circuits as established in the first or preliminary test. Here the electrical characteristics in the leads are sequentially subjected to electrical impulses so as to assure that the circuits are correct and undisturbed by the work performed on them. Final electrical testing here is accomplished with all wires and molds in position and before any disassembly from the board. The branch take-out junction elements have frozen the wire groupings by providing a matrix of resin insulating material about the grouped leads as they diverge toward separate end positions. This fixes dimensional control over branch leads.

The board is then indexed transversely through a wrapping operation at a rate of lineal movement coordinated with wrapping speed so as to provide desired lead or overwrap to pressure sensitive tape. The harness is stripped from the board and from the terminal receptacles as it is passed through the wrapping station. If the final test indicated defects, the harness unit is not wrapped but is merely passed through the wrapping station and tagged for reject and/or repair. The boards are then recycled for assembly of new wire harnesses thereon. Additional electrical and visual inspection of the completed product harness may be made at or before shipment in accord with specific test requirements imposed by harness purchasers.

Figure 2:
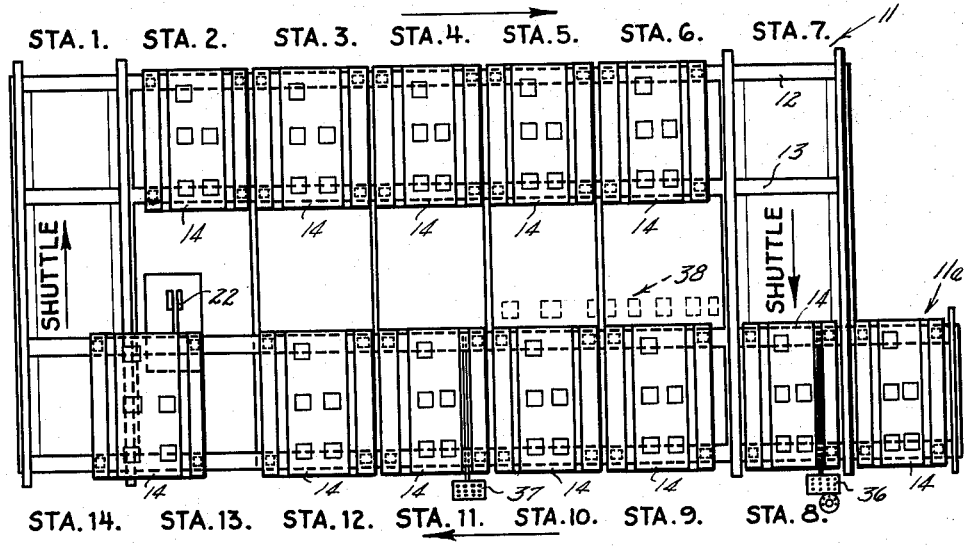
FIGURE 2 is a schematic plan view of the assembly line apparatus utilized to automate the production of wire harnesses and illustrating the movable wire harness assembly boards thereon capable of being recycled through the assembly, test, repair, encapsulation, and wrap stations and including cross shuttle at the ends thereof.

By reference to FIGURES 2 and 3 the assembly line support structure 10 of the preferred embodiment of the invention is configured to support a horizontally oriented track structure 11 thereon. The track structure 11 consists of spaced-apart track elements 12 and 13 and is of closed elongate substantially rectangular configuration. As shown schematically in FIGURE 2, a repair station track 11a is provided as an ancillary portion of the track structure whereby wire harness assembly board fixtures 14, bearing defective wire harness assemblies, may be shunted for necessary remedial repairs.

A plurality of wire harness assembly board fixtures 14 are provided for use upon the track structure. The board fixtures 14 are provided with roller or caster elements 15 which engage the track elements 12 and 13 so as to permit the board fixture 14 to be moved along the assembly line from station to station (stations 1–14 and return) as the wire harness is being fabricated and tested. Transverse movement between the reverse flow flights is facilitated by tracking in which the casters 15 roll.

The upper surface of each of the assembly board fixtures 14 is provided with a plurality of work stations such as terminal molds 17, branch take-out molds 18, wire locator and guide pins 19, and a multiple contact assembly board fixture block 20, as best shown in FIGURE 4.

The terminal molds 17 consist of mold halves which are configured to receive and encapsulate the terminal connectors 21 of individual circuit wires in the wire harness structure and to provide insulating jackets thereabout. The terminal connectors 21 engage mating disconnect test receptacles 23 provided within one of the mold halves and said connection is isolated by use of a dielectric sleeve isolating elements so as to permit combination test and mold functions to be carried out without shorting against molds 17 or board fixtures 14. The test receptacles 23 also serve to center the terminal connectors 21 in spaced-apart relation within the mold cavity and to selectively isolate them from electrical contact with the molds 17. The test receptacles 23 also provide male or female connections for the connectors 21 so that the connectors 21 are prepared to conduct electricity when plugged into mating sockets. In some instances the receptacles 23 are pivotal in the mold cavities to facilitate insertion and removal of connectors 21. The test receptacles 23 are provided with test leads 24 that lead to the multiple contact block 20. Various types of wire guide clamps are provided on said molds for wire orientation. Guide pin elements 25 are provided within the molds for selected positioning of wires therein. Resilient cushion dams are provided to complete closure of the mold cavity and also to secure and clamp the wire harness leads within the mold itself. The terminal molds 17 and branch take-out molds 18 are provided with quick disconnect lock elements for securing said molds during the actual molding operation. As will be appreciated, the molds 17 and 18 will vary in form in accord with the style of encapsulating jacket or branch take-out utilized.

For purposes of simplicity and clarity of presentation (FIGURE 4) four individual wire harness circuit elements 26, 27, 28, and 29 are utilized in assembling a wire harness structure upon the assembly board fixture 14. Each individual wire element 26, 27, 28 and 29 is strung on the assembly board fixture 14 in accordance with a predetermined orientation plan and the terminal ends thereof with connectors 21 are inserted in pre-selected of said test receptacles 23 and in the mold elements 17. The test leads 24 from each mold element 17 and receptacle 23 are connected to preselected of the multiple contactors A, A', B, B', C, C', D, and D' provided on block 20. Thus, if properly assembled, the terminal ends of wire elements 26, 27, 28 and 29 will be operably connected to selected pairs of said contactors. For example, the terminal connectors 21 of circuit wire element 26 are thus connected to contacts D and D' by use of selected of the test leads 24 provided in the board fixture 14. Therefore, an electrical continuity test may be performed on circuit element 26 by superimposing a test circuit across contacts D and D', thereby closing the circuit with respect to circuit wire element 26. Similarly, the terminals connectors 21 of wire elements 27, 28 and 29 would be connected to contacts C and C', B and B' and A and A', respectively. Each of these wire elements can then be tested for continuity in the same manner. Current will not flow, for example, if the wire is broken or the connections are faulty. Current will not flow if the wrong connectors 21 are in improper receptacles 23. As will be appreciated the conducting characteristics of the wire may be concurrently examined.

FIGURE 5 is a schematic view of a test circuit assembly which is employed to conduct the electrical continuity test described above. A multiple contact test block 30 is provided having spring loaded contacts in substantial register with the contacts of the multiple contact board fixture block 20. As shown in the drawings at FIGURE 5, the contact elements of each block 20 and 30 are brought into conductive registering engagement with each other. Each contact in the test block 30 is lettered to coincide with its mating contact on the block 20, below, and thus clearly shows continuity of the circuitry involved. The block 20 is fixed on the board 14 and is movable therewith. The block 30 is located as desired along the path of board 14 and in registry with the moving path of block 20. Although not specifically shown, the contact between blocks 20 and 30 is resilient and the test block 30 is moved into contact with the board mounted block 20, the spring loaded contacts assuring good electrical connection.

In FIGURE 5 the selector switch assembly 32 is schematically shown with contactor 33 closing selected of said wire harness leads 26, 27, 28 and 29 across their respective contacts through the lower board mounted block 20 to the selector associated block 30. Individual powering means 34 are supplied to selected of the leads 26, 27, 28 and 29 through the manipulation of the switch contactor 33. The selector switch assembly 32 is remote from the movable board 14 and, if the circuit tests correctly for continuity, the indicator device (light) 31 on the corresponding indicated circuit will be energized. Where conductive characteristics are sought to be tested the meters 35, for example, voltage, ammeters or resistance read-out means may be superimposed on the circuits for read-out check. Hence, as shown in phantom line in the test circuit of FIGURE 5, means 35 may be included therein to conduct a millivolt drop check across each of said wire elements.

The foregoing electrical continuity and millivolt drop test equipment is located at desired stations on the assembly line. As shown in FIGURES 2 and 3, the preliminary electrical continuity test fixture 36 at station 8 and final check at test fixture 37, for example, at station 11. After the preliminary electrical continuity check is conducted at station 8, the assembly board fixture 14 is moved to stations 9, 10, and 11 and the individual molds are "shot" by use of special injection molding machines (not shown) selectively positioned on the assembly line as on support frames 38 in substantial overhanging register with the individual molds 17 and 18 on the assembly board fixture element 14.

After encapsulation, the final electrical continuity and millivolt drop checks are performed and the mold elements are unloaded so that the wire harness is ready for wrapping by wrap assembly means 22, as indicated in reference to station 13.

In FIGURE 6, a completed harness 39 is shown as it is removed from the described apparatus. An encapsulating four terminal connector jacket 40, molded during progress through the process is shown having two female terminal contactors 41 and two male contactors 42. As will be appreciated during molding these elements were in electrical contact with receptacles 23 provided in the mold, for example, mold 17. The leads 43 are imbedded in the encapsulating resin matrix material at selected points and are grouped as shown. A group retainer ring 44 is also provided as in the instance of the branch junction take-out element 45 by casting or injecting resin material so as to encapsulate and imbed the leads 43 as shown. This fixes the grouping of leads 43 and in the case of the junction take-out 45 provides a dimensional and locating control over the branch 46, shown as comprising only two of the four leads 43. The terminal ends of the leads in branch 46 are provided with a pair of connectors 47 and 48, the connector 47 being jacketed as in reference to the encapsulating jacket 40 and the connector 48 being of the open slip type. The main grouping of leads 49 comprising any number of leads in accord with a specific harness structure is led to the two contactor socket and prong elements 50 and the plural leads 43 are imbedded or encapsulated in the jacket 51 of insulating material. As desired an additional wire grouping retainer 52 is cast about the main lead group 49 before it enters the jacket 51.

Wrapping 53 is provided substantially retaining the harness 39 in the dimensional position established upon assembly. This is accomplished in the wrapping structure as described and the branch 46 is hand wrapped or may be machine wrapped by passing through the wrapping machine 22, if its length is substantial.

In operation, the process has proved to have exceptional value in increasing production and providing higher production standards. The uniformity of the product harness has been enhanced and many manual operations have been eliminated.

The apparatus in usage has proved simple to erect and maintain using relatively standard components. The simplicity of the switching leads and test circuits is amenable to compact form and has made testing economical and selectively locatable at any point in production. The board set ups may be easily varied to meet specific harness requirements and the molds for terminal encapsulation have proved to be very amenable to automatic and semiautomatic control over closure, filling, and stripping.

Harness structures prepared in accord with the foregoing described invention are unusually accurate in final assembly and, by reason of the unique keepers cast around junctions and wire groups, retain their basic form for integration in cooperating electrical and electronic equipment.

Having thus described my invention, the disclosure will suggest many improvements and modifications to those skilled in the art. Such improvements and modifications are intended to be included herein limited only by the scope of the hereinafter appended claims.

I claim:

1. In a method for the fabrication and in situ testing of wire harness structures, the steps including: assembling a plurality of individual circuit leads having terminal connectors at the ends thereof into a pre-determined fixed wire harness configuration on a wire harness assembly board fixture; loading the terminal connectors of said circuit leads into mating disconnect test receptacles positioned within terminal connector molds provided on said assembly board fixtures; electrically testing said circuit leads in situ prior to molding of said terminal connectors; charging the test molds so as to encapsulate the terminal connectors of said circuit leads; and electrically testing said circuit leads in situ after molding of said terminal connectors.

2. In an assembly line apparatus for the fabrication and in situ testing of a wire harness structure, the combination including: an assembly line base support structure having a closed substantially rectangular track provided thereon, said track provided with assembly, test, molding and wrap work stations therealong; a plurality of wire harness assembly board fixtures adapted to engage said track and be movable thereon, said board fixtures selectively provided with wire harness assembly, mold and test means thereon; electrical continuity test structures selectively provided along said tract, said electrical continuity test structures adapted to selectively engage said test means provided on said board fixtures; molding machine means provided along said track, said molding machine means adapted to selectively charge said mold means provided on said board fixtures; and wrap means provided along said track, said wrap means adapted to selectively wrap wire harness structures positioned on said board fixtures.

3. In an apparatus for the fabrication and in situ testing of wire harnesses wherein wire harness assembly board structures are sequentially cycled through a series of assembly, test and mold stations, the combination comprising: a wire harness assembly board fixture having locator means thereon for orienting wire leads into a predetermined wire harness structure having main, junction, and branch portions groups, said wire harness assembly board fixture adapted for selective cyclical movement through a series of assembly, test and mold stations; branch take-out molds mounted on said assembly board fixture, said branch take-out molds adapted to receive selected wire leads therethrough and radially distributed them so as to form a branch junction; terminal connector mold elements selectively mounted on said board fixture, said mold elements provided with test receptacles therein for selective engagement with terminal connectors of wire leads mounted on said board fixture; a multiple contact board fixture block provided on said assembly board fixture, said board fixture block provided with pairs of contact elements adapted to engage an external test circuit; and test take-out leads provided on said assembly board fixture, said test take-out leads connecting test receptacles of selected pairs of said molds to selected of said pairs of said contact elements.

4. In a method for the fabrication and in situ testing of wire harness structures, the steps including:
   (a) assembling a plurality of individual circuit leads having terminal connectors at the ends thereof into a pre-determined fixed wire harness pattern upon an assembly board surface;
   (b) loading the terminal connectors of said circuit leads into pairs of electrical mating disconnect test receptacles provided in terminal connector molds which are positioned in a pre-determined fixed spaced apart relationship with each other upon said assembly board surface;

(c) moving said circuit leads through a sequence of work stations while maintaining said pre-determined fixed wire harness pattern so as to insure dimensional stability in the wire harness end product;

(d) electrically testing said circuit leads in situ prior to molding of said connectors while maintaining said pre-determined fixed wire harness pattern;

(e) selectively charging said molds so as to encapsulate said terminal connectors of said circuit leads while maintaining said pre-determined fixed wire harness pattern; and (f) electrically testing said circuit leads in situ after molding of said terminal connectors.

5. In a method for the fabrication of wire harness structures, the steps including:

(a) assembling upon an assembly board surface a plurality of individual circuit leads having terminal connectors at the ends thereof into a pre-determined fixed wire harness pattern having main, junction, and branch portions;

(b) loading said junction portions into branch take-out molds which are positioned in a pre-determined fixed spaced apart relationship to each other upon said assembly board surface;

(c) loading the terminal connectors of said circuit leads into pairs of mating disconnect test receptacles positioned within terminal connector molds which are positioned in a pre-determined fixed spaced apart relationship to each other upon said assembly board surface;

(d) moving said circuit leads through a sequence of work stations while maintaining said pre-determined fixed wire harness pattern so as to insure dimensional stability in the wire harness end product;

(e) electrically testing said circuit lead in situ while maintaining said predetermined fixed wire harness pattern; and (f) selectively charging said branch take-out and said terminal connector molds so as to encapsulate said junction portions and said terminal connectors while maintaining said pre-determined fixed wire harness pattern.

6. In a method for the fabrication and in situ testing of wire harness structures, the steps including:

(a) assembling upon an assembly board surface a plurality of individual circuit leads having terminal connectors at the ends thereof into a pre-determined fixed wire harness pattern having main, junction, and branch portions;

(b) loading said junction portions into branch take-out molds which are positioned in a pre-determined fixed spaced apart relationship to each other upon said assembly board surface;

(c) loading the terminal connectors of said circuit leads into pairs of electrical mating disconnect test receptacles provided in terminal connector molds which are positioned in a pre-determined fixed spaced apart relationship with each other upon said assembly board;

(d) moving said circuit leads through a sequence of work stations while maintaining said pre-determined fixed wire harness pattern so as to insure dimensional stability in the wire harness end product;

(e) electrically testing said circuit leads in situ prior to molding of said connectors while maintaining said pre-determined fixed wire harness pattern;

(f) selectively charging said branch take-out and said terminal connector molds so as to encapsulate said junction portions and said terminal connectors while maintaining said pre-determined fixed wire harness pattern; and (g) electrically testing said circuit leads in situ after molding of said terminal connectors.

7. In an apparatus for the fabrication of wire harnesses, the combination comprising:

(a) an assembly line support structure;

(b) a plurality of wire harness assembly fixtures provided on said assembly line support structure, said wire harness assembly fixtures adapted for cycling through a series of assembly, test and mold stations positioned around said assembly line support structure;

(c) locator means provided on said wire harness assembly fixtures for orienting wire leads into a pre-determined fixed wire harness configuration having main, junction and branch portions; and (d) terminal end mold elements mounted on said wire harness assembly fixtures in a pre-determined fixed spaced apart relationship with each other, said critically positioned terminal end mold elements adapted to receive the terminal ends of wire leads mounted on said assembly fixtures so as to insure dimensional stability in the wire harness end product.

8. In an apparatus for the fabrication of wire harnesses, the combination comprising:

(a) an assembly line support structure;

(b) a plurality of wire harness assembly fixtures provided on said assembly line support structure, said wire harness assembly fixtures adapted for cycling through a series of assembly, test and mold stations positioned around said assembly line support structure;

(c) locator means provided on said assembly fixtures for orienting wire leads into a pre-determined fixed wire harness configuration having main, junction and branch portions;

(d) terminal end mold elements mounted on said wire harness assembly fixtures in a pre-determined fixed spaced apart relationship with each other, said critically positioned terminal end mold elements adapted to receive the terminal ends of wire leads mounted on said assembly fixtures so as to insure dimensional stability in the wire harness end product; and (e) branch take-out mold elements mounted on said wire harness assembly fixtures in a pre-determined fixed spaced apart relationship with said terminal end mold elements, said branch take-out molds adapted to receive selected wire leads therethrough and radially distribute them so as to form wire harness branch junctions.

9. In an apparatus for the fabrication of wire harnesses, the combination comprising:

(a) an assembly line support structure;

(b) a plurality of wire harness assembly fixtures provided on said assembly line support structure, said wire harness assembly fixtures adapted for cycling through a series of assembly, test and mold stations positioned around said assembly line support structure;

(c) locator means provided on said assembly fixtures for orienting wire leads into a pre-determined fixed wire harness configuration having main, junction, and branch portions;

(d) terminal end mold elements mounted on said wire harness assembly fixtures in a pre-determined fixed spaced apart relationship with each other so as to insure dimensional stability in the wire harness end product, said terminal end mold elements provided with test receptacles therein for selective engagement with terminal end connectors of wire leads mounted on said assembly fixtures;

(e) a multiple contact assembly structure block provided on each of said assembly fixtures, said multiple contact assembly structure block provided with pairs of contact elements adapted to engage an external test circuit; and (f) test take-out leads provided on said assembly fixtures, said test take-out leads connecting test receptacles of selected pairs of said terminal end mold elements to selected pairs of said contact elements.

10. In an apparatus for the fabrication of wire harnesses, the combination comprising:
  (a) an assembly line support structure;
  (b) a plurality of wire harness assembly fixtures provided on said assembly line support structure, said wire harness assembly fixtures adapted for cycling through a series of assembly, test and mold stations positioned around said assembly line support structure;
  (c) locator means provided on said assembly fixtures for orienting wire leads into a pre-determined fixed wire harness configuration having main, junction, and branch portions;
  (d) terminal end mold elements mounted on said wire harness assembly fixtures in a pre-determined fixed spaced apart relationship with each other so as to insure dimensional stability in the wire harness end product, said terminal end mold elements provided with test receptacles therein for selective engagement with terminal end connectors of wire leads mounted on said assembly fixtures;
  (e) a multiple contact assembly structure block provided on each of said assembly fixtures, said multiple contact assembly structure block provided with pairs of contact elements adapted to engage an external test circuit;
  (f) test take-out leads provided on said assembly fixtures, said test take-out leads connecting test receptacles of selected pairs of said terminal end mold elements to selected pairs of said contact elements; and
  (g) branch take-out mold elements mounted on said wire harness assembly fixtures in a pre-determined fixed spaced apart relationship with said terminal end mold elements, said branch take-out molds adapted to receive selected wire leads therethrough and radially distribute them so as to form wire harness branch junctions.

11. In an assembly line apparatus for the fabrication and in situ testing of a wire harness structure, the combination including:
  (a) an assembly line base support structure provided with assembly line means thereon, said assembly line means provided with assembly, test, and molding stations therearound;
  (b) a plurality of wire harness assembly fixtures provided on said assembly line means, said assembly fixtures being sequentially cycleable through said assembly, test, and molding stations,
  (c) locator means provided on said assembly fixtures for orienting wire leads into a pre-determined fixed wire harness configuration having main, junction, and branch portions;
  (d) terminal end mold elements mounted on said wire harness assembly fixtures in a pre-determined fixed spaced apart relationship with each other so as to insure dimensional stability in the wire harness end product;
  (e) electrical continuity test means provided on said assembly fixtures in association with said terminal end mold elements, said test means adapted to engage the terminal ends of wire leads placed in said terminal end mold elements;
  (f) electrical continuity test structures selectively provided along said assembly line means, said electrical continuity test structures adapted to operatively engage said electrical continuity test means provided on said wire harness assembly fixtures; and
  (g) molding machine means provided along said assembly line means, said molding machine means adapted to selectively charge said terminal end mold elements provided on said wire harness assembly fixtures.

12. In a method for the fabrication and in situ testing of wire harness structures, the steps including:
  (a) assembling a plurality of individual circuit leads having terminal connectors at the ends thereof into a pre-determined fixed wire harness configuration upon an assembly board surface;
  (b) loading the terminal connectors of each of said circuit leads into pairs of mating disconnect test receptacles positioned within terminal connector molds that are fixedly positioned upon said assembly board surface so as to provide positive dimensional control over said circuit leads;
  (c) superimposing a test circuit across each of said pairs of test receptacles so as to electrically test said circuit leads prior to molding of said terminal connectors;
  (d) charging the said molds so as to encapsulate the terminal connectors of said circuit leads; and
  (e) superimposing a test circuit across each of said pairs of test receptacles so as to electrically test said circuit leads after molding of said terminal connectors.

13. In a method for the fabrication and in situ testing of wire harness structures, the steps including:
  (a) assembling a plurality of individual circuit leads having terminal connectors at the ends thereof into a pre-determined fixed wire harness configuration upon an assembly board surface;
  (b) loading the terminal connectors of each of said circuit leads into pairs of mating disconnect test receptacles positioned within terminal connector molds that are fixedly positioned upon said assembly board surface so as to provide positive dimensional control over said circuit leads;
  (c) superimposing an electrical test circuit across each of said pairs of test receptacles so as to visibly indicate defects in said circuit leads prior to molding of said terminal connectors;
  (d) charging the said molds so as to encapsulate the terminal connectors of said circuit leads; and
  (e) superimposing an electrical test circuit across each of said pairs of test receptacles so as to visibly indicate defects in said circuit leads after molding of said terminal connectors.

References Cited by the Examiner

UNITED STATES PATENTS

| | | | |
|---|---|---|---|
| 1,574,297 | 2/1926 | Lilleberg | 174—72 |
| 1,738,710 | 12/1929 | Jones | 29—407 |
| 1,760,538 | 5/1930 | Becker | 29—203 |
| 2,559,141 | 7/1951 | Williams | 264—40 |
| 2,713,194 | 7/1955 | Roach | 29—155.55 |
| 2,729,850 | 1/1956 | Dewees | 264—272 |
| 2,768,428 | 10/1956 | MacGregor et al. | 29—203 |
| 2,877,544 | 3/1959 | Gammel | 29—401 |
| 2,987,804 | 6/1961 | Nichol | 29—155.55 |
| 2,991,328 | 7/1961 | Lay | 174—72 |

WHITMORE A. WILTZ, *Primary Examiner.*

J. F. CAMPBELL, *Examiner.*

T. H. EAGER, J. W. BOCK, *Assistant Examiners.*